(12) United States Patent
Al-Saud et al.

(10) Patent No.: US 8,920,739 B2
(45) Date of Patent: Dec. 30, 2014

(54) INCREASED EFFICIENCY IN THE SYNTHESIS OF CARBON NANOMATERIAL

(75) Inventors: Turki Saud Mohammed Al-Saud, Riyadh (SA); Mohammed A. Bin Hussain, Riyadh (SA); Siarhei Alexandrovich Zhdanok, Minsk (BY); Andrei Vladimirovich Krauklis, Minsk (BY); Petr Petrovich Samtsou, Minsk (BY); Anatolij Ivanovich Loznikov, Minsk (BY)

(73) Assignee: King Abddulaziz City for Science and Technology, Riyadh (SA)

( * ) Notice: Subject to any disclaimer, the term of this patent is extended or adjusted under 35 U.S.C. 154(b) by 181 days.

(21) Appl. No.: 13/153,478

(22) Filed: Jun. 6, 2011

(65) Prior Publication Data
US 2012/0085636 A1  Apr. 12, 2012

(30) Foreign Application Priority Data
Oct. 6, 2010  (BY) .................................. U 20100831

(51) Int. Cl.
| | |
|---|---|
| *B01J 19/08* | (2006.01) |
| *B82Y 30/00* | (2011.01) |
| *B82Y 40/00* | (2011.01) |
| *C01B 31/02* | (2006.01) |

(52) U.S. Cl.
CPC .............. *B01J 19/088* (2013.01); *B82Y 30/00* (2013.01); *B82Y 40/00* (2013.01); *C01B 31/0206* (2013.01); *B01J 2219/0809* (2013.01); *B01J 2219/0815* (2013.01); *B01J 2219/0826* (2013.01); *B01J 2219/0835* (2013.01); *B01J 2219/0869* (2013.01); *B01J 2219/0871* (2013.01); *B01J 2219/0883* (2013.01); *B01J 2219/0894* (2013.01); *Y10S 977/734* (2013.01); *Y10S 977/899* (2013.01)
USPC ...... 422/186; 422/186.04; 422/119; 422/112; 204/164; 204/173; 977/734; 977/899

(58) Field of Classification Search
CPC ............. B01J 19/088; B01J 2219/0809; B01J 2219/0815; B01J 2219/0826; B01J 2219/0835; B01J 2219/0869; B01J 2219/0871; B01J 2219/0883; B01J 2219/0894; B82Y 30/00; B82Y 40/00; C01B 31/0206
USPC ............. 204/173, 164; 422/186, 186.04, 119, 422/112; 977/734, 899
See application file for complete search history.

(56) References Cited

U.S. PATENT DOCUMENTS

| | | | |
|---|---|---|---|
| 2003/0192813 A1* | 10/2003 | Yan et al. ................... | 209/127.1 |
| 2004/0265211 A1* | 12/2004 | Dillon et al. ............... | 423/447.3 |
| 2009/0056628 A1* | 3/2009 | Kortshagen et al. ......... | 118/718 |
| 2009/0169437 A1* | 7/2009 | Taube et al. .................. | 422/109 |

* cited by examiner

*Primary Examiner* — Xiuyu Tai
(74) *Attorney, Agent, or Firm* — Raj Abhyanker, P.C.

(57) ABSTRACT

Disclosed is a system or method of increased efficiency in carbon nanomaterial synthesis. In one embodiment, a system or method of automated collection of deposited carbon nanomaterial is disclosed. According to one or more embodiments, a method of automated collection of deposited nanomaterial may comprise using cleaner blades to clean the wall of a deposition chamber and the surface of a central body where carbon nanomaterial has been deposited. The method of automated carbon nanomaterial collection may be used in connection with a method of carbon nanomaterial synthesis, to create a more efficient synthesis process.

6 Claims, 6 Drawing Sheets

US 8,920,739 B2

INCREASED EFFICIENCY IN THE SYNTHESIS OF CARBON NANOMATERIAL

CLAIM OF PRIORITY

This is a US Utility application and claims priority from Belarus Application No. u 20100831 filed on Oct. 6, 2010.

FIELD OF TECHNOLOGY

This disclosure relates generally to the technical fields of carbon nanotechnologies and, in one example embodiment, to a system and method of efficiently synthesizing carbon nanomaterials through the use of an automatic cleaning system.

BACKGROUND

Carbon nanomaterial synthesis may produce a carbon nanomaterial deposited on a wall of a deposition chamber. When a deposited material accumulates, it may become thicker. After the deposited material reaches a certain thickness, the rate of carbon nanomaterial formation may decrease. In order to speed the rate of formation back up, the carbon nanomaterial may need to be collected. Collection of the carbon nanomaterial may involve physically disassembling and reassembling the deposition chamber. The disassembly and reassembly of the deposition chamber may take a certain amount of time and involve human labor. During this collection time, new carbon nanomaterial may not be synthesized. This wasted time may significantly reduce the efficiency of the carbon nanomaterial synthesis.

SUMMARY

Disclosed are a system and/or a method of increased efficiency in carbon nanomaterial synthesis. In one aspect, a deposition chamber is equipped with a system for automated collection of the deposited carbon nanomaterial. In one embodiment, the system comprises a plurality of cleaner blades located in the gap between the wall of the deposition chamber and the surface of a co-axially located central body. In one or more embodiment, the blades are fixed on a rocker coupled to a rotation drive, which rotates. In one or more embodiment, the rocker is equipped with a support abutment, which contacts a master cam, which translates the rotational motion of the rocker into a linear motion of the cleaner blades against a wall of the deposition chamber and a surface of the central body.

In one aspect, the system of carbon nanomaterial synthesis further comprises a plasma chemical reactor comprising a quartz tube. In one or more embodiments, the quartz tube further comprises a cathode connected to an energy source, an anode with a central hole, and a gas supply system. In one or more embodiments, the central anode connects the anode with the deposition chamber. In one or more embodiments, the deposition chamber comprises a co-axially located central body. According to one aspect, the central body is conic and the central hole of the anode is a truncated cone that is a continuation of the deposition chamber. The system may also include thermocouples installed on the inner wall of the deposition chamber and on the surface of the central body to monitor the temperature.

In one aspect, the method of increased carbon nanomaterial synthesis includes detecting a presence of an untreated gas mixture when the untreated gas mixture is fed in a quartz tube through a gas supply. In one aspect, a treated gas mixture is created by treating the untreated gas mixture with a high-voltage discharge plasma in the zone between the cathode and the anode. In one aspect, the synthesized carbon nanomaterial is directed together with the gas flux into deposition chamber via the opening in the anode. The produced carbon nanomaterial is deposited on the walls of the deposition chamber and on the surface of the co-axially located central body. In one or more embodiments, the synthesized carbon nanomaterial is cleaned by a plurality of cleaner blades, which are fixed on a rocker coupled to a rotation drive. When the rocker is rotated by the rotation drive, the attached support abutment contacts a master cam, which makes the cleaner blades press against the wall of the deposition chamber and against the surface of the central body. In one or more embodiments, the carbon nanomaterial that is scraped by the cleaner blades is sent to a collecting bin, and a hot waste gas is released outside.

Therefore, the system and method disclosed herein may be more effective, because the system and method described may not require time for setup cooling, and deposition chamber disassembling and reassembling to remove the carbon nanomaterial. Removing the time required for these additional steps may significantly increase the efficiency of the carbon nanomaterial synthesis process, and may save time and money.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying Drawings and from the Detailed Description that follows.

DETAILED DESCRIPTION

Disclosed are a system, a method and/or a composition of increased efficiency in carbon nanomaterial synthesis. It will be appreciated that the various embodiments discussed herein need not necessary belong to the same group of exemplary embodiments; and may be grouped into various other embodiments not explicitly disclosed herein. In the following description, for the purpose of explanation, numerous specific details are set forth in order to provide a thorough understanding of various embodiments.

Figure 1:
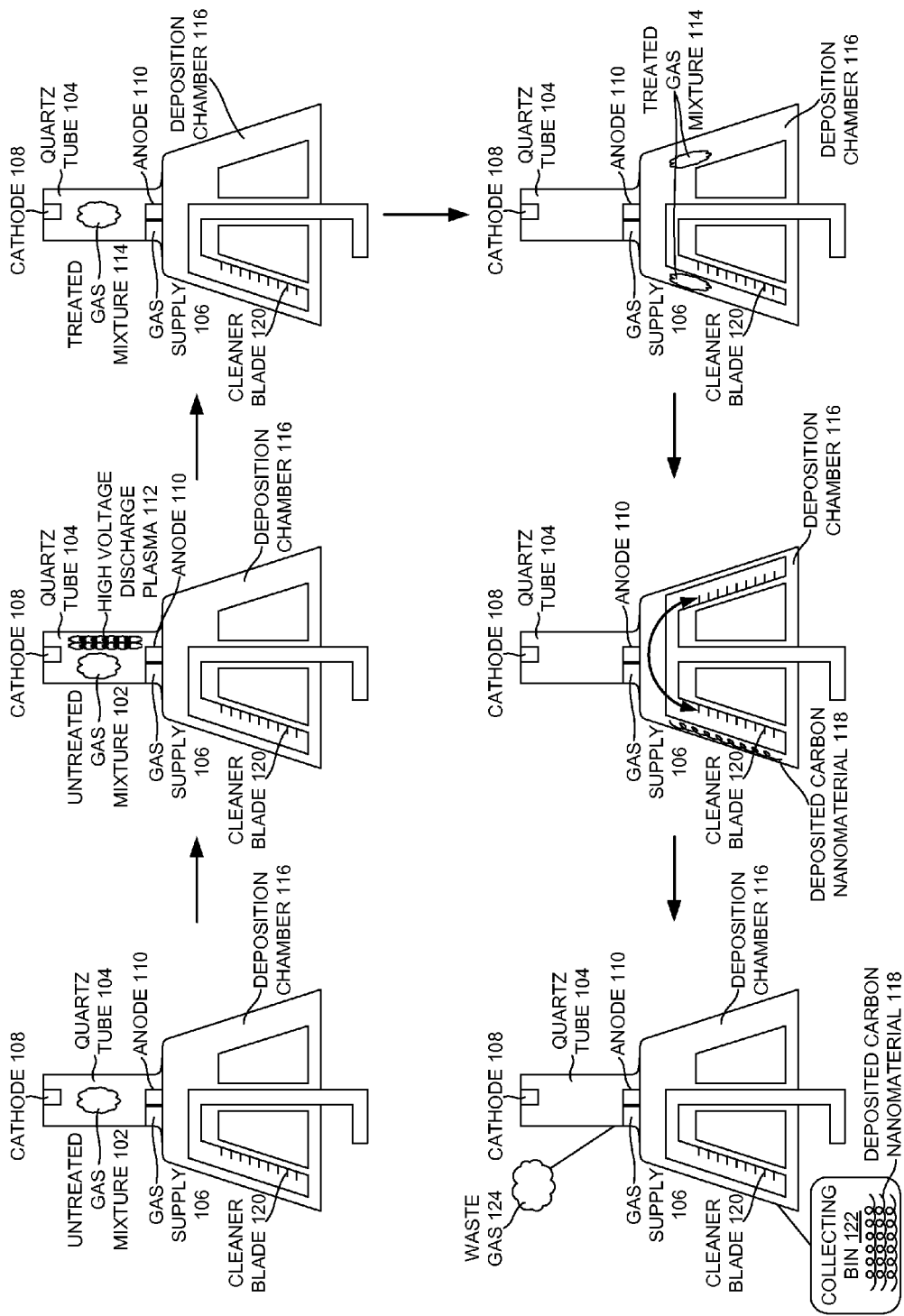
FIG. 1 is a graphical process flow diagram illustrating a method for the automated collection of carbon nanomaterial, according to one or more embodiments.

FIG. 1 is a graphical process flow diagram illustrating a method for the automated collection of carbon nanomaterial, according to one or more embodiments. In one or more embodiments the presence of an untreated gas mixture 102 may be detected when the untreated gas mixture 102 is fed into a quartz tube 104 through a gas supply 106. The quartz tube 104 may comprise a cathode 108 and an anode 110. The untreated gas mixture 102 may be treated by a high-voltage discharge plasma 112 in the quartz tube 104 in the zone between the cathode and the anode 110 to create a treated gas mixture 114.

The treated gas mixture 114 may be released in a deposition chamber 116 through an opening of the anode 110. A deposited carbon nanomaterial 118 may be deposited in the deposition chamber 116. The deposited carbon nanomaterial 118 may be a multi-walled or single-walled carbon nanotube, a carbon nanofiber or a nanographite particle. A carbon nanofiber may be a cylindrical structure with graphene layers stacked as cones, cups or plates. Graphene is an allotrope of carbon and stacked sheets of graphene may form graphite.

Carbon nanofibers that are perfect cylinders may be called carbon nanotubes. Carbon nanomaterials may exhibit extraordinary strength and unique electrical properties and may be good thermal conductors. Multi-wall carbon nanotubes comprise multiple layers, such as concentric rolled cylinders, of graphite. Single-wall carbon nanotubes comprise just a single layer of graphene. A single-wall carbon nanotube may be one nanometer in diameter and hundreds or millions of nanometers long.

Carbon nanotubes may be the strongest materials known in terms of tensile strength. Tensile strength may be a measure of a stress a material can withstand while being pulled or stretched apart. Carbon nanotubes may also be the stiffest materials known in terms of elastic modulus. An elastic modulus is a description of a material's tendency to deform elastically, or non-permanently, when a force is applied to it. Young's modulus may describe a form of elasticity known as tensile elasticity, also known as an object's tendency to deform along an axis when opposing forces are applied along that axis. Carbon nanotubes have a Young's modulus that is about 5 times greater than that of steel. Carbon nanotubes may also be very lightweight and have high thermal conductivity.

The deposited carbon nanomaterial 118 may be used to develop polymer nanocomposites. A nanocomposite may be a multiphase material wherein one phase has a dimension of less than 100 nanometers (nm). A polymer nanocomposite may be a polymer or copolymer having dispersed in its nanoparticles. Polymer nanocomposites may be strong and may have unique thermal and electrical properties. Because of these properties, polymer nanocomposites may be important to a number of industries including mechanical engineering, instrument-making, chemistry, aircraft building, electronics, and electrical engineering.

The deposited carbon nanomaterial 118 may be cleaned using a plurality of cleaner blades 120. The deposited carbon nanomaterial 118 may be sent to a collecting bin 122 coupled to the deposition chamber 116. A waste gas 124 may be released.

Figure 2A:
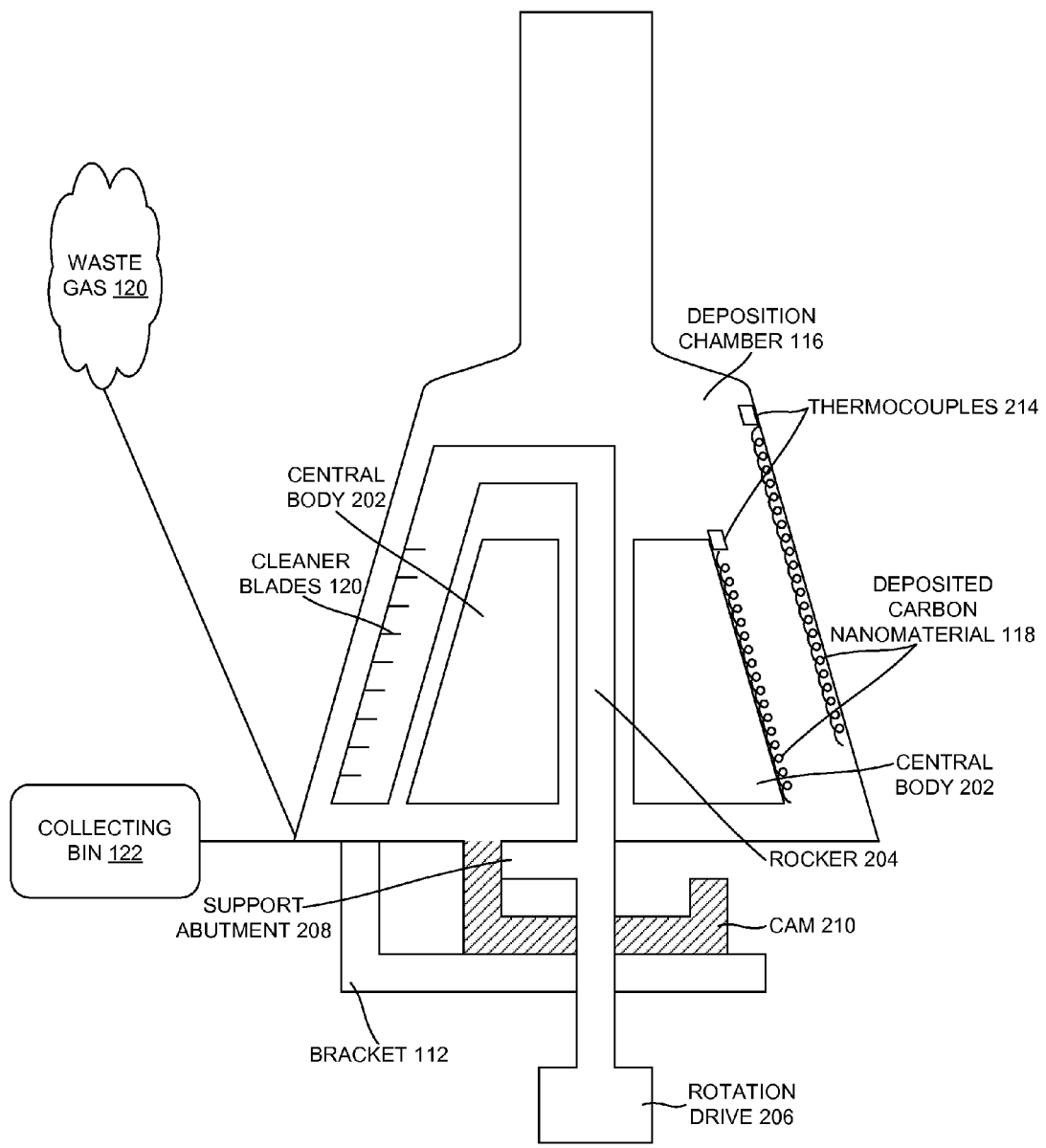
FIG. 2A is a diagram illustrating a setup for a system and method of automated carbon nanomaterial collection, according to one or more embodiments.

FIG. 2A is a diagram illustrating a setup for a system and method of automated carbon nanomaterial collection, according to one or more embodiments. In one or more embodiments, a deposition chamber 116 for a deposited carbon nanomaterial 118 may comprise a central body 202. The deposition chamber 116 may also be equipped with a cleaner blades or plurality of cleaner blades 120. The cleaner blade 120 may be fixed on a rocker 204, which may be coupled to a rotation drive 206. The rotation drive 206 may also be coupled to a support abutment 208. When the rotation drive 206 rotates, the support abutment 208 may contact a master cam 210. The cam 210 may then translate the rotational motion of the rocker 204 into a linear motion of the cleaner blade 120, by pressing the blade first against a wall of the deposition chamber 102 and then against the surface of the central body 202. The master cam 210 and the support abutment 208 may be coupled to a bracket 212 which may be coupled to the deposition chamber 116.

The system may also comprise a collecting bin 122 to collect the deposited carbon nanomaterial once it has been scraped by the cleaner blades 120. The system may also comprise a thermocouple or plurality of thermocouples 214 to monitor the temperature in the deposition chamber 116 and the central body 202. In one or embodiments, the temperature in those areas may be between 600° and 900° C. The thermocouples 214 may be located on the walls of the deposition chamber 116 and on the surface of the central body 202. The thermocouples 214 may be K-type thermocouples.

Figure 2B:
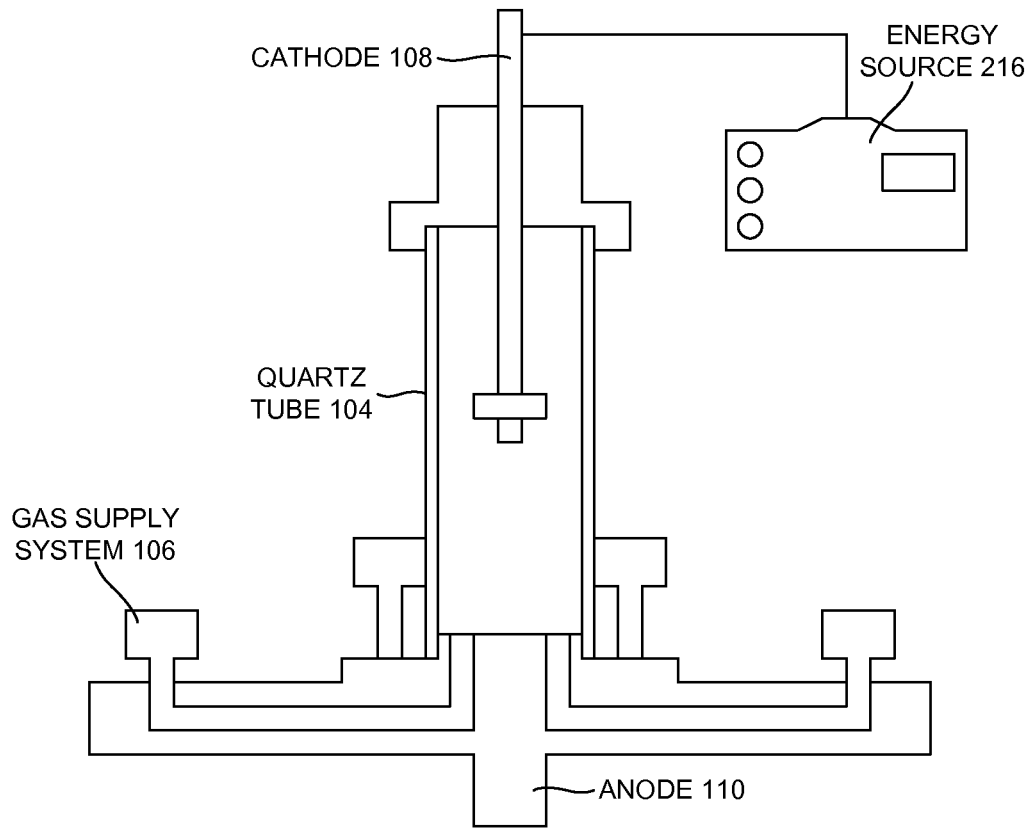
FIG. 2B is a diagram illustrating a setup for a system and method of carbon nanomaterial synthesis with automated collection of a deposited carbon nanomaterial, according to one or more embodiments.

FIG. 2B is a diagram illustrating a setup for a system and method of carbon nanomaterial synthesis with automated collection of a deposited carbon nanomaterial, according to one or more embodiments. In one or more embodiments, a plasma chemical reactor may be used. The plasma chemical reactor may comprise a quartz tube 104. The quartz tube 104 may further comprise a cathode 108 coupled to an energy source 216. In one or more embodiments, the energy source 216 may be a power supply. The cathode may be an electrode through which electric current flows out. An anode 110 may have the shape of a disc with a central hole. The anode may be an electrode through which electric current flows in a polarized electric device. The anode 110 and a gas supply system 106 may be located in the quartz tube 104. The quartz tube 104 may be coupled to the deposition chamber through the central hole in the anode 110.

According to one or more embodiments, a method of efficient carbon nanomaterial synthesis may comprise detecting the presence of an untreated gas mixture 102 when the untreated gas mixture 102 is fed in the quartz tube 104, using the gas supply system 106. The untreated gas mixture 102 may comprise a mixture of methane and air. In one or more embodiments, the untreated gas mixture 102 may comprise a mixture of methane and air in the ratio ranging from 1:2.4 to 1:2.5. In one or more embodiments, the method may further comprise treating the untreated gas mixture 102 with a high-voltage discharge plasma 112 in the zone between the cathode 108 and the anode 110 to create a treated gas mixture 114. The treated gas mixture 114 may be released in the deposition chamber 116 through an opening in the anode 110. A deposited carbon nanomaterial 118 may be deposited on the wall of the deposition chamber 116 and on the surface of the co-axially located central body 202.

The deposited carbon nanomaterial 118 may be cleaned using the plurality of cleaner blades 120, which may be fixed on the rocker 204 that may be rotated by the rotation drive 206. When the rocker 204 rotates, the support abutment 208 may contact the master cam 210, which may translate the rotational motion into a linear motion, and may press the cleaner blades against the wall of the deposition chamber 116 and then against the surface of the central body 202 to clean the deposited carbon nanomaterial 118. Once the deposited carbon nanomaterial has been scraped by the blades, it may be sent to a collecting bin 122 and a hot waste gas 124 may be released to the external environment.

Figure 3:
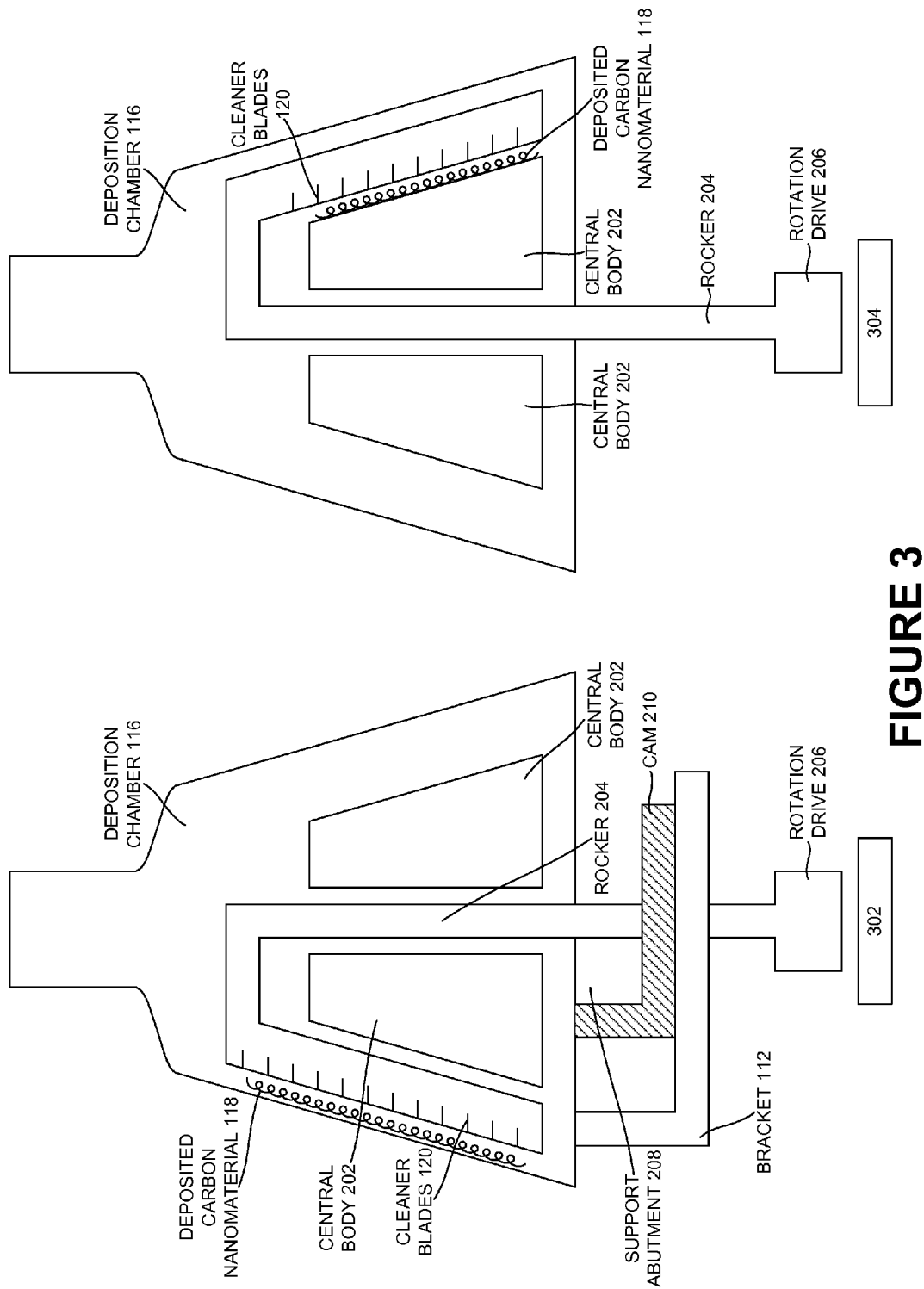
FIG. 3 is a graphical process flow diagram illustrating a method of cleaning a deposited carbon nanomaterial using a plurality of cleaner blades, according to one or more embodiments.

FIG. 3 is a graphical process flow diagram illustrating a method of cleaning a deposited carbon nanomaterial using a plurality of cleaner blades, according to one or more embodiments. In operation 302, the cleaner blades 120 may be pressed against a wall of a deposition chamber 116 and collect a deposited carbon nanomaterial 118. This may further comprise rotating a rocker 204 coupled to the cleaner blades 120 using a rotation drive 206. The rotation drive may 206 also be coupled to a support abutment 208 through a master cam 210. The master cam 210 may translate the rotational motion of the rocker 204 into a linear motion of the cleaner blade 120. The master cam 210 and the support abutment 208 may be coupled to a bracket 212 which may be coupled to the deposition chamber 116.

In operation 304, the cleaner blades may be pressed against a surface of a central body 202 and collect a deposited carbon nanomaterial 118. This may further comprise rotating a rocker 204 coupled to the cleaner blades 120 using a rotation drive 206. The rotation drive may 206 also be coupled to a support abutment 208 through a master cam 210. The master cam 210 may translate the rotational motion of the rocker 204 into a linear motion of the cleaner blade 120. The master cam 210 and the support abutment 208 may be coupled to a bracket 212 which may be coupled to the deposition chamber 116.

The use of the cleaner blades 120 may increase an efficiency of the carbon nanomaterial synthesis process and increase an amount of the deposited carbon nanomaterial 118. If the deposited carbon nanomaterial 118 is cleaned by hand, a significant amount of time may be expended to cool the setup, disassemble the deposition chamber 116, remove the carbon nanomaterial 118, and reassemble the deposition chamber 116. Removing the time needed for these additional steps may allow synthesis of a greater amount of deposited carbon nanomaterial 118 in the same amount of time, or an equal amount of deposited carbon nanomaterial 118 collected in a shorter time. The efficiency of the process of carbon nanomaterial synthesis may be important to all of the industries that make use of carbon nanomaterial. The faster that the deposited carbon nanomaterial 118 may be synthesized and collected, the cheaper and more readily available it may be to those industries.

By removing the need to cool, disassemble and reassemble the deposition chamber 116, the use of cleaner blades 120 to collect a deposited carbon nanomaterial 118 may also remove the need for human oversight or intervention during the carbon nanomaterial synthesis process. This may also lead to cost savings by reducing the need to pay labor to oversee the process and by allowing scientists working the lab to focus on other things while the process is running instead of having to constantly intervene to remove the deposited carbon nanomaterial 118.

Figure 4:
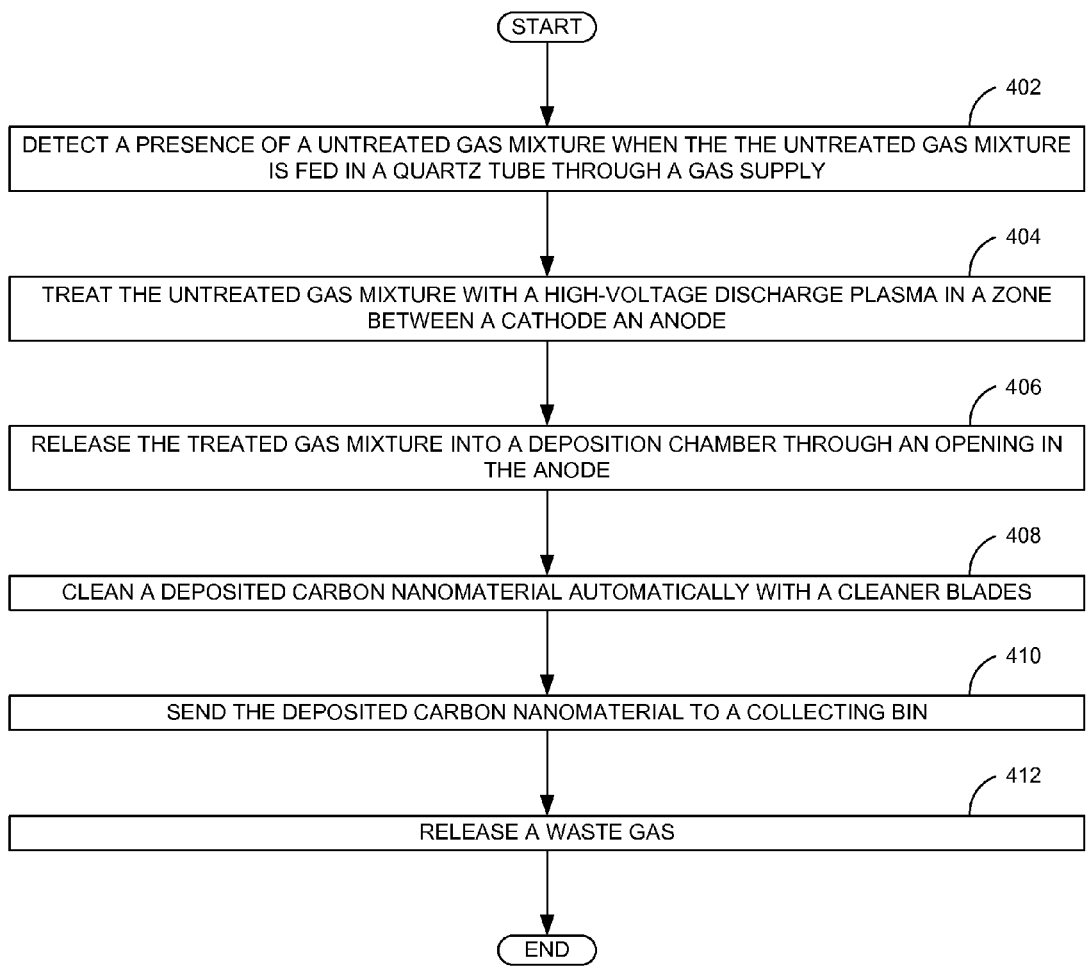
FIG. 4 is a process flow diagram illustrating a method of increasing efficiency in carbon nanomaterial synthesis, according to one or more embodiments.

FIG. 4 is a process flow diagram illustrating a method of increasing efficiency in carbon nanomaterial synthesis, according to one or more embodiments. In operation 402, the presence of an untreated gas mixture 102 may be detected when the untreated gas mixture 102 is fed in a quartz tube 104 through a gas supply system 106. The untreated gas mixture 102 may comprise a mixture of methane and air. In one embodiment, the untreated gas mixture 102 may comprise a mixture of methane and air in a ratio ranging from 1:2.4 to 1:2.5. In operation 404, a treated gas mixture 114 may be created by treating the untreated gas mixture 102 with a high-voltage discharge plasma 112 in a zone between a cathode 108 and an anode 110.

In operation 406, the treated gas mixture 114 may be released in a deposition chamber 116 through an opening in the anode 110. In operation 408, a deposited carbon nanomaterial 118 may be cleaned automatically with a plurality of cleaner blades 120. In operation 410, the deposited carbon nanomaterial 118 may be sent to a collecting bin 122. In operation 412, a waste gas 124 may be released in the external environment.

Figure 5:
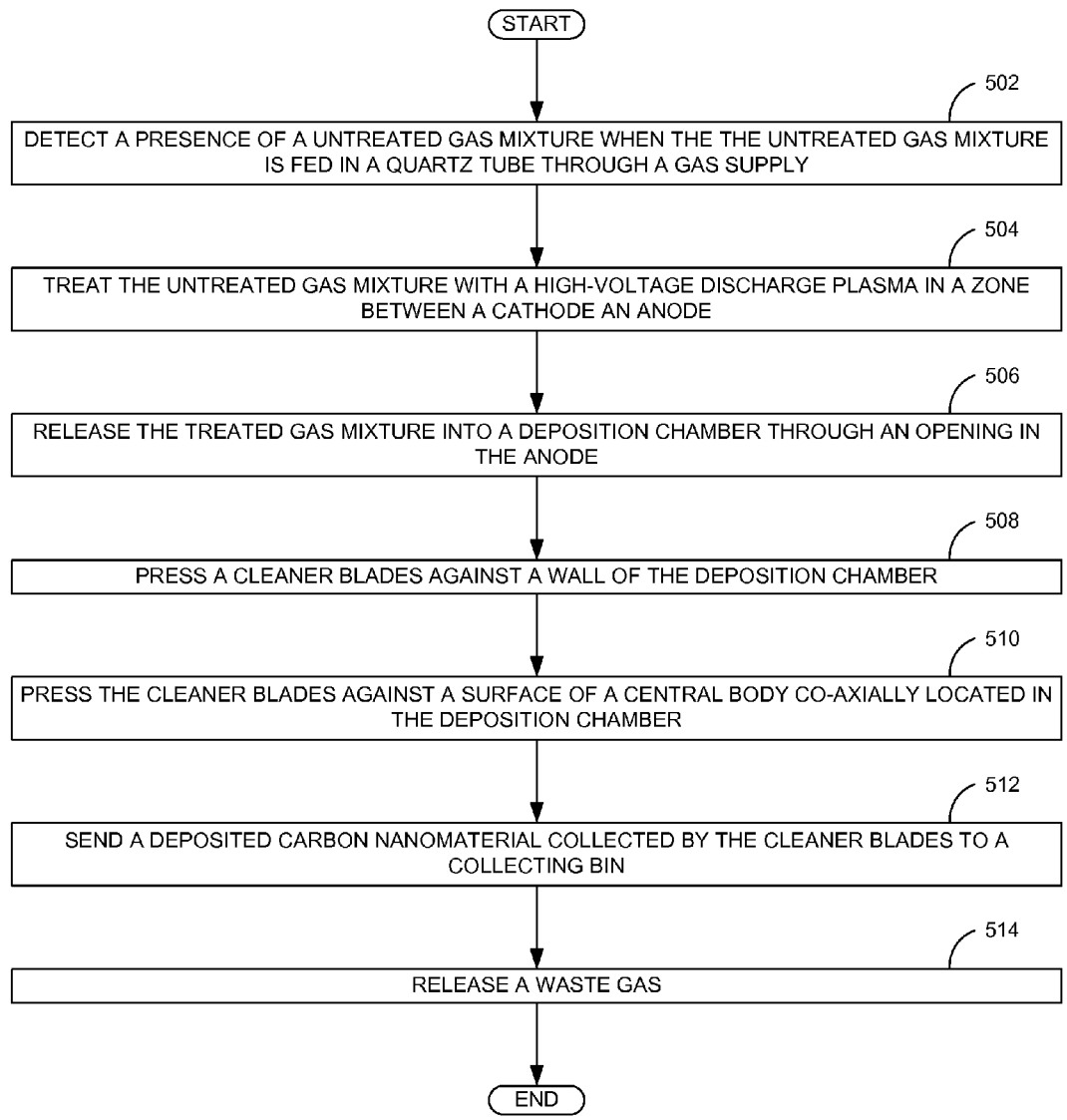
FIG. 5 is a process flow diagram illustrating another method of efficient carbon nanomaterial synthesis, according to one or more embodiments.

FIG. 5 is a process flow diagram illustrating another method of efficient carbon nanomaterial synthesis, according to one or more embodiments. In operation 502, the presence of an untreated gas mixture 102 may be detected when the untreated gas mixture 102 is fed in a quartz tube 104 through a gas supply system 106. The untreated gas mixture 102 may comprise a mixture of methane and air. In one embodiment, the untreated gas mixture 102 may comprise a mixture of methane and air in a ratio ranging from 1:2.4 to 1:2.5. In operation 504, a treated gas mixture 114 may be created by treating the untreated gas mixture 102 with a high-voltage discharge plasma 112 in a zone between a cathode 108 and an anode 110.

In operation 506, the treated gas mixture may be released in an opening in the deposition chamber through an opening in the anode. In operation 508, the plurality of cleaner blades may be pressed against a wall of the deposition chamber. In operation 510, the plurality of cleaner blades may be pressed against the surface of the central body that is co-axially located in the deposition chamber. In operation 512 the carbon nanomaterial collected by the plurality of cleaner blades may be sent to a collecting bin. In operation 514, a waste gas may be released to an external environment.

Although the present embodiments have been described with reference to specific example embodiments, it will be evident that various modification and changes may be made to these embodiments without departing from the broader spirit and scope of the various embodiments. Accordingly, the specification and drawings are to be regarded in an illustrative rather than a restrictive sense.

What is claimed is:

1. A system of automated collection of produced carbon nanomaterial, comprising:
   a plasma chemical reactor, comprising a quartz tube, the quartz tube comprising a cathode coupled to an energy source and an anode;
   a gas supply system located in the quartz tube;
   a deposition chamber coupled to the quartz tube to collect a deposited carbon nanomaterial;
   a central body co-axially located in the deposition chamber;
   a plurality of cleaner blades installed between the central body and a wall of the deposition chamber to clean the deposited carbon nanomaterial,
      wherein the plurality of cleaner blades is attached to a portion of a rocker, which is positioned between the central body and the wall of the deposition chamber, and
      wherein a rotational motion of the rocker provides for sequential cleaning of a surface of the central body and the wall of the deposition chamber by the plurality of cleaner blades to thoroughly and efficiently collect the deposited carbon nanomaterial; and
   a collecting bin to hold the cleaned deposited carbon nanomaterial.

2. The system of claim 1, further comprising:
   a master cam coupled to the rocker through a support abutment to translate the rotational motion of the rocker into a linear motion of the plurality of cleaner blades.

3. The system of claim 1, wherein the plurality of cleaner blades clean the deposited carbon nanomaterial by sequentially pressing against the wall of the deposition chamber and then against the surface of the central body co-axially located in the deposition chamber.

4. The system of claim 1, further comprising:
   a plurality of thermocouples to monitor a temperature in the deposition chamber and the central body.

5. The system of claim 4, wherein the temperature in the deposition chamber and the central body ranges from 600° to 900° C.

6. The system of claim 1, wherein an efficiency of a carbon nanomaterial synthesis is increased by cleaning the deposited carbon nanomaterial automatically with the plurality of cleaner blades.

\* \* \* \* \*